United States Patent [19]

Belsan et al.

[11] Patent Number: 5,329,622
[45] Date of Patent: Jul. 12, 1994

[54] SYSTEM FOR RETRIEVAL OF A DATA RECORD BY BUFFERING THE RECORD IN SEGMENTS AND BEGINNING TRANSMISSION PRIOR TO THE BUFFER OBTAINING THE ENTIRE RECORD

[75] Inventors: Jay S. Belsan, Nederland; Charles A. Milligan, Golden, both of Colo.

[73] Assignee: Storage Technology Corporation, Louisville, Colo.

[21] Appl. No.: 780,998

[22] Filed: Oct. 23, 1991

Related U.S. Application Data

[63] Continuation of Ser. No. 419,593, Oct. 10, 1989, abandoned.

[51] Int. Cl.⁵ .............................................. G06F 13/14
[52] U.S. Cl. ................................. 395/250; 364/236.2; 364/238.6; 364/239.1; 364/DIG. 1
[58] Field of Search ................ 395/800, 425, 250, 200

[56] References Cited

U.S. PATENT DOCUMENTS

| | | | |
|---|---|---|---|
| 4,723,223 | 2/1988 | Hanada | 395/425 |
| 4,918,651 | 4/1990 | Bonke | 395/800 |
| 5,155,811 | 10/1992 | Dean | 395/250 |

Primary Examiner—Thomas C. Lee
Assistant Examiner—Jennifer M. Orzech
Attorney, Agent, or Firm—Duft, Graziano & Forest

[57] ABSTRACT

The multiple step data read apparatus provides a buffer memory (108-0) for each read/write head (110-0) in the rotating media (111-0) data storage system that can store up to the entire track (400) of data that includes the requested data (Sectors 2-6). The data is fragmented such that the data transferred into the read/write head buffer first is transmitted to the control unit first whether or not that data is at the beginning of the data requested by the control unit. The data is further fragmented such that critical portions of the data are available to the control unit to satisfy the host request as soon as the data is read from the device. This fragmenting results in the data becoming available to the control unit in the minimum time possible and the performance of the subsystem being the maximum possible. In addition each data fragment transfer to the control unit (104) is initiated a predetermined time before the end of the fragment of data such that the read/write head (110-0) reaches the end of the fragment the same time that the last sector of the fragment is transmitted to the control unit (104).

17 Claims, 5 Drawing Sheets

INDEX

| SECTOR 0 | SECTOR 1 | SECTOR 2 | . . . | SECTOR N |

SYSTEM FOR RETRIEVAL OF A DATA RECORD BY BUFFERING THE RECORD IN SEGMENTS AND BEGINNING TRANSMISSION PRIOR TO THE BUFFER OBTAINING THE ENTIRE RECORD

This application is a continuation of application Ser. No. 07/419,593, filed on Oct. 10, 1989, now abandoned.

CROSS REFERENCE TO RELATED APPLICATIONS

This application is related to application Ser. No. 304,662 entitled Read/Write Head Buffer, application Ser. No. 304,788 entitled Track Image Read/Write Head Buffer now abandoned, and application Ser. No. 304,664 entitled Address Mark Triggered Read/Write Head Buffer now abandoned, all filed on Jan. 31, 1989.

FIELD OF THE INVENTION

This invention relates to data storage systems and, in particular, to a multistep data read apparatus that is used in a rotating media data storage system to improve the data transfer performance of the data storage system.

PROBLEM

It is a problem in the field of data storage systems to minimize the data retrieval time when reading a data record from a data storage system. In disk drive memory systems for example, a processor is typically connected by a channel interface unit to a plurality of data channels. Each data channel is connected to one or more Direct Access Storage Device (DASD) units which function to store large quantities of data. Each DASD unit includes a control unit for interfacing with the data channel that typically carries eight bit parallel data in a byte serial decoded input/output record format. The control unit performs a data management function to maintain records of the location of all the data stored in the DASD unit. The DASD unit includes rotating data storage media consisting of a plurality of disks, each of which has associated therewith one or more moveable read/write heads. The data is stored on the rotating media in a track format that consists of a plurality of concentric rings of data. A control module is also included at the head of a string of disk drive units and connected to the control unit to convert between the eight bit parallel data format of the data channel and the bit serial data format of the rotating media. In addition, the control module controls data formatting and error correction code generation. The control module is connected by way of a bus to a plurality of read/write heads attached to an actuator, each of which serves to read and write data on an associated disk of the rotating media.

In a data read operation, the processor transmits a seek request, through the channel interface unit and an available data channel, to the DASD control unit associated with the rotating media on which the requested data is stored. The processor, upon completion of the transmission of the seek request, returns to processing other tasks. The DASD control unit responds to the seek request by determining the physical location of the requested data on the plurality of disks. The control unit transmits information to the associated control module identifying the physical location and size of the data in order to retrieve the requested data from one of the disks of the rotating media. Since the data is stored in a track format on a rotating media, the actuator associated with the identified disk of the rotating media on which the requested data is stored must wait until the rotating media rotates a sufficient distance to present the beginning of the requested data underneath the read/write head associated with the actuator.

A predetermined time before the beginning of the requested data reaches the read/write head associated with the actuator, the control module requests the control unit to obtain a data communication path to the processor in order to transmit the retrieved data from the rotating media directly to the processor over this data communication path. If a data communication path to the processor is not available, the control module must wait for one entire revolution of the rotating media before the media is again in the position where the requested data is a sufficient distance away from the read/write head to establish a data communication path to the processor. This process is repeated until a data communication path to the processor is available and the data, as read by the read/write head, can be transmitted directly via the control module and control unit and an available data channel to the processor. It is obvious that there can be numerous delays in this data storage system while data communication paths are established. In a transaction based system, where there are a multitude of random data seeks, such delays can unnecessarily tie up actuators in the disk drive unit and significantly increase the system response time.

SOLUTION

The above described problems are solved and a technical advance achieved in the field by a combination of a cache memory in the control unit and a multiple step data read apparatus that improves data transfer performance in a rotating media data storage system by using a multiple step data read apparatus at the read/write head that is also independent of the control module, control unit and the availability of the data communication path from the control unit to the processor. This is accomplished by providing a buffer memory for each read/write head in the rotating media data storage system that can store the plurality of sectors the make up the track of data that includes the requested data. This read/write head buffer retrieves all or a portion of the track that contains the requested data in multiple steps so that not only is that portion of the track desired for caching purposes staged into cache in the minimum time possible, but also the target data record is available to satisfy the host request in the minimum time possible.

The multiple step data read apparatus responds to a request to read data that spans a plurality of track sectors by retrieving the data in one, two, or three data fragments. Each data fragment transfer to the control unit is initiated a predetermined time before the end of the fragment of data such that the read/write head reaches the end of the fragment the same time that the last sector of the fragment is transmitted to the control unit. The data is fragmented such that the data transferred into the read/write head buffer first is transmitted to the control unit first whether or not that data is at the beginning of the data requested by the control unit. The data is further fragmented such that critical portions of the data are available to the control unit to satisfy the host request as soon as the data is read from the device. This fragmenting results in the data becoming available to the control unit in the minimum time possible and the performance of the subsystem being the maximum possible.

The data sectors in the track read by the read/write head are stored in the read/write head buffer in two, seven run length limited (RLL) self clocking code format with the error correction code bits appended to each data sector. The read/write head buffer does not process the data read from the rotating media but instead stores this data for subsequent deformatting and processing by the control module. The read/write head buffer includes a phase locked loop to maintain signal clocking independent of the control module. The error correction codes written on the rotating media to protect the integrity of the requested data sectors are maintained since they are stored in the read/write head buffer along with the data sectors. Thus, once a data communication path is established to the processor, the control module receives the image that was stored on the rotating media from the read/write head buffer and can deformat this data from the bit serial, two, seven run length limited self clocking coding with error correction characters format of this data to the eight bit parallel data that is in an input/output record format for use by the control unit. The control unit stores the decoded error checked data and transmits the requested data record to the processor over the available data channel.

DETAILED DESCRIPTION

In computer systems, a processor is typically connected by a channel interface unit to a plurality of data channels. Each data channel is connected to one or more Direct Access Storage Device (DASD) units which function to store large quantities of data. These DASD units typically use rotating data storage media comprised of either optical disks or magnetic disks to store data records thereon.

A typical DASD unit is the 3370-type disk drive unit that uses magnetically readable/writable disks as the data storage media. Each of these 3370-type DASD units includes a control unit for interfacing with a data channel to the processor that typically carries eight bit parallel data in a byte serial decoded input/output record format. The control unit performs a data management function to maintain records of the physical location of all the data stored on the DASD unit. The DASD unit includes rotating data storage media typically consisting of a plurality of magnetically readable/writable disks, each of which has associated therewith one or more moveable read/write heads. The data is stored on the rotating media in a track format that consists of a plurality of concentric rings of data. A control module is also included at the head of a string of disk drive units and connected to the control unit to convert between the eight bit parallel data format of the data channel and the bit serial data format of the rotating media. In addition, the control module controls data formatting and error correction code generation. The control module is connected by way of a bus to a plurality of read/write heads attached to an actuator, each of which serves to read and write data on an associated disk of the rotating media.

Traditional Data Read Operation

In a data read operation, the processor transmits a seek request, through the channel interface unit and an available data channel, to the DASD control unit associated with the rotating media on which the requested data is stored. The processor, upon completion of the transmission of the seek request, returns to processing other tasks. The DASD control unit responds to the seek request by determining the physical location of the requested data on the plurality of disks. The control unit transmits information to the associated control module identifying the physical location and size of the data in order to retrieve the requested data from one of the disks of the rotating media. Since the data is stored in a track format on a rotating media, the actuator associated with the identified disk of the rotating media on which the requested data is stored must wait until the rotating media rotates a sufficient distance to present the beginning of the requested data underneath the read/write head associated with the actuator.

A predetermined time before the beginning of the requested data reaches the read/write head associated with the actuator, the control module requests the control unit to obtain a data communication path to the processor in order to transmit the retrieved data from the rotating media directly to the processor over this data communication path. If a data communication path to the processor is not available, the control module must wait for one entire revolution of the rotating media before the media is again in the position where the requested data is a sufficient distance away from the read/write head to establish a data communication path to the processor. This process is repeated until a data communication path to the processor is available and the data, as read by the read/write head, can be transmitted directly via the control module and control unit and an available data channel to the processor. It is obvious that there can be numerous delays in this data storage system while data communication paths are established. In a transaction based system where there are a multitude of random data seeks, such delays can unnecessarily tie up actuators in the disk drive unit and significantly increase the system response time.

Multiple Step Data Read Theory of Operation

The multiple step data read apparatus improves data transfer performance in a rotating media data storage system by using a combination of a cache memory in the control unit and a multiple step data read apparatus at the read/write head that is also independent of the control module, control unit and the availability of the data communication path from the control unit to the processor. This is accomplished by providing a buffer memory for each read/write head in the rotating media data storage system that stores the plurality of data sectors that make up the entire track of data that includes the requested data. This read/write head buffer retrieves all or a portion of the track that contains the requested data record in multiple steps so that not only is the portion of the track desired for caching purposes staged into cache in the minimum time possible but the target data record is available to satisfy the host request in the minimum time possible.

The multiple step data read apparatus responds to a request to read data that spans a plurality of track sectors by retrieving the data in one, two, or three data fragments. Each data fragment transfer to the control unit is initiated a predetermined time before the end of the fragment of data such that the read/write head reaches the end of the fragment the same time that the last sector of the fragment is transmitted to the control unit. The data is fragmented such that the data transferred into the read/write head buffer first is transmitted to the control unit first whether or not that data is at the beginning of the data requested by the control unit. The data is further fragmented such that critical portions of the data are available to the control unit to satisfy the host request as soon as the data is read from the device. This fragmenting results in the data becoming available to the control unit in the minimum time possible and the performance of the subsystem being the maximum possible.

The data sectors in the track read by the read/write head are stored in the read/write head buffer in run length limited self clocking code format (such as 2, 7 coding) with the error correction code bits appended to each data sector. The read/write head buffer does not process the track image read from the rotating media but instead temporarily stores this track image for subsequent deformatting and processing by the control module. The read/write head buffer includes a phase locked loop to maintain signal clocking independent of the control module. The error correction codes written on the rotating media to protect the integrity of the requested data sectors are maintained since they are stored in the read/write head buffer along with the data record. Thus, once a data communication path is established to the processor, the control module receives the image that was stored on the rotating media from the read/write head buffer and can deformat this data from the bit serial, run length limited self clocking (ex. two, seven) coding with error correction characters format of this data to the eight bit parallel data that is in an input/output record format for use by the control unit. The control unit stores the decoded error checked data record and transmits the requested data record to the processor over the available data channel.

System Architecture

Figure 1:
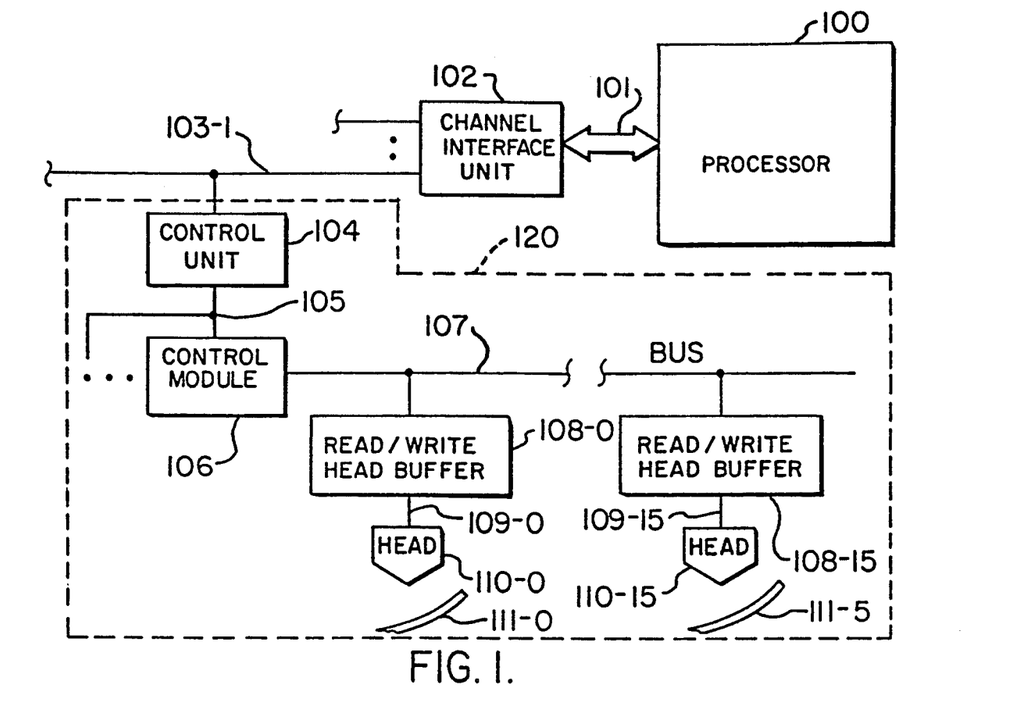
FIG. 1 illustrates the overall architecture of the multiple step data read apparatus as placed in a data processing environment.

FIG. 1 illustrates the overall architecture of a data processing system that is equipped with an associated data storage system that includes a plurality of memory devices, one of which is 20 illustrated in FIG. 1 in the form of a conventional 3370-type of disk drive unit 120. Processor 100 is connected via bus 101 to a channel interface unit 102 that serves to interconnect processor 100 with a plurality of data channels 103-1 to 103-n, each of which is an eight bit parallel data bus. Connected to one of these data channels 103-1 is the disk drive unit 120 mentioned above.

Disk drive unit 120 includes a control unit 104 that functions to provide overall management of the disk drive unit 120. This management function includes storing information that identifies the exact physical location of all data stored on the rotating media 111-0 to 111-15 of disk drive unit 120. Processor 100 identifies a data record by volume identification and address. While this information provides a general physical location of the data, the exact storage location on the rotating media 111-0 to 111-15 requires additional specificity. Control unit 104 provides this additional specific information by converting the volume and address information received from the processor into head, actuator, track and sector identification information to precisely define the physical location of the requested data on disk drive unit 120. The control unit 104 also contains a cache memory, a random access electronic storage used to retain frequently used data for faster access by the channel. Algorithms running in the control unit 104 predicts which data the host will access so that data can be stored in the cache.

The control unit 104 transfers data between data channel 103-1 and one or more control modules (ex. 106) in an eight bit parallel data format wherein each eight bits of data comprise one of a series of bits of the data in a decoded input/output record format. The data in this format is converted by control module 106 into a bit serial format wherein error correction code characters are appended thereto for error detection and control purposes. The resultant data is then encoded into two, seven code. The control module 106 responds to the control signals transmitted by control unit 104 identifying the head, actuator, track and sector for storing a data record by selecting one of the actuators 110-0 to 110-15 that are used by disk drive unit 120 to read/write data on the rotating media 111-0 to 111-15. While sixteen actuators are illustrated herein, it is expected that future devices may be equipped with 32 or more actuators. The actuators include the read/write head and signal control circuitry for reading and writing the data on the rotating media 111-0 to 111-15.

The above-described conventional disk drive unit 120 of FIG. 1 is also equipped with a plurality of read/write head buffers 108-0 to 108-15 on a one per read/write head basis. The read/write head buffer 108-0, for example, is interposed between bus 107 and read/write head 110-0. The exact physical implementation of this read/write head buffer can also be a single memory connected to bus 107 and partitioned into segments, one segment for each read/write head 108 in disk drive unit 120. Read/write head buffer 108-0 serves to temporarily store the entire data track image captured by the read/write head 110-0.

Read/Write Mead Buffer Circuit

Figure 2:
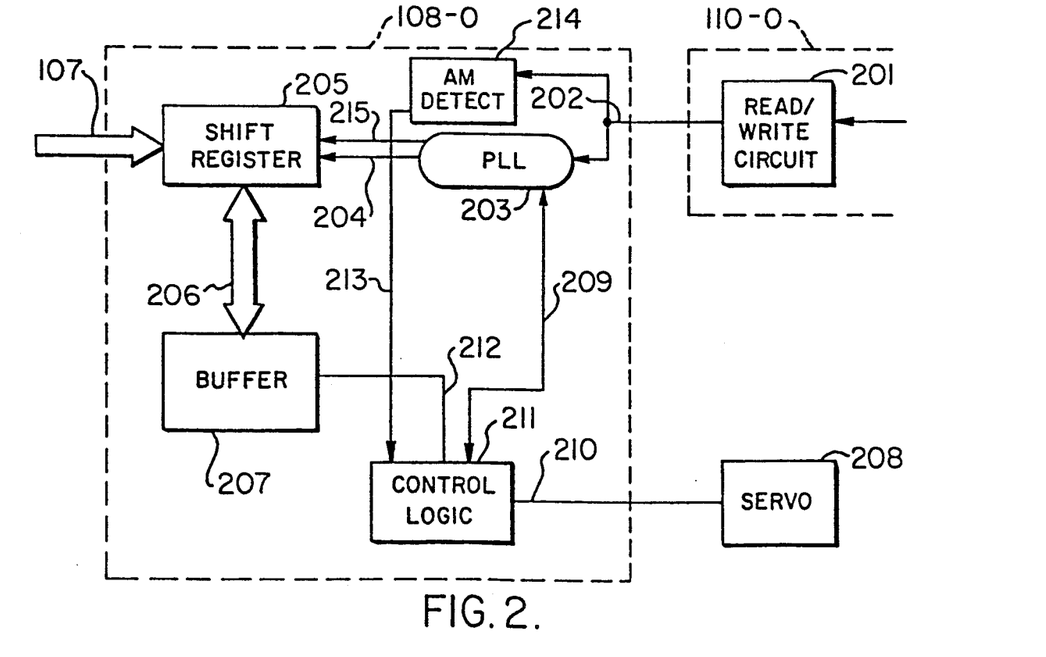
FIG. 2 illustrates additional circuit details of the read/write head buffer.

FIG. 2 illustrates additional detail of read/write head buffer 108-0. Data is read in analog form by read/write circuit 201 of read/write head 110-0 and converted into a digital signal that is typically self clocked. The digital data signal is transmitted by read/write circuit 201 on lead 202 to read/write head buffer 108-0 where it is applied to phase locked loop 203 and ID sync detect circuit 214. The ID sync detect circuit 214 monitors the digital data signal to identify the presence of an ID sync burst that appears in the beginning of each data sector stored on the media 111-0. Once ID sync detect circuit 214 verifies the presence of the ID sync burst, the phase locked loop 203 is activated to separate the data from the clock in the digital data signal and applies the data via lead 215 and the clock via lead 204 to shift register 205. The synchronization signal also enables phase locked loop 203 to attain frequency lock with the data in the data sector. The clock and data signals on leads 204 and 215 enable shift register 205 to receive the serial bits of data and store these data bits in its memory. Each 16 bit byte of 2, 7 encoded data that is stored in shift register 205 is transmitted over bus 206 in parallel form to buffer 207. The addressing of buffer 207 is accomplished by the use of the disk drive servo 208 which identifies the sector count of the rotating media in well-known fashion and outputs this information on lead 210 to control logic 211. The sector count is converted by control logic 211 to a pointer value that is output on lead 212 to address buffer 207. The clock signal from phase locked loop 203 is used to maintain clock timing synchronization to load data into buffer 207. Thus, the digital data signal that is read from the rotating media 111-0 is maintained in the proper clocking synchronization by the use of phase locked loop 203 so that the data stored via shift register 205 in buffer 207 accurately represents the data stored on the track of the rotating media 111-0.

The accuracy of this data stored in buffer 207 is insured because this data along with its associated error correction code bits is stored in a two, seven code format. The image of the entire data storage track is thereby temporarily stored in buffer 207 for transmission to control module 106 via shift register 205 and bus 107. Read/write head buffer 108-0 therefore appears transparent to control module 106 in that the output of read/write head buffer 108-0 is identical to the signal output by read/write head 110-0 except for its lack of synchronization with the rotating media 111-0. Control module 106 resynchronizes the data obtained from read/write head buffer 108-0, therefore any data storage errors occasioned by read/write head buffer 108-0 due to defects in the rotating media 111-0 are easily corrected by control module 106 by use of its own internal phase locked loop and error correction circuitry. Maintenance of the error correction codes through read/write head buffer 108-0 minimizes the possibility of an error occurring in the data transfer process.

Track Data Image

Figure 3:
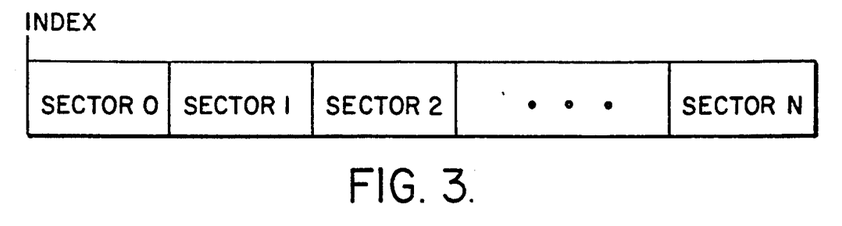
FIG. 3 illustrates the format of the data storage track.

The format of a typical data storage track is illustrated in Table 1 and FIG. 3. This format is the standard Fixed Block Architecture (FBA) well known in the field of data storage systems. The data storage track consists of a plurality of data sectors (Sector 0, Sector 1, ... Sector N) that are concatenated together to form a continuous string of data. Each data sector (ex. Sector 1) contains a fixed amount (ex. 512 bytes) of the actual data, to which has been prepended an ID field and a data synchronization field. The ID and data synchronization fields are separated from each other by a gap field of predetermined length. The gap field contains a predetermined sequence of 1s and 0s indicative of a particular gap field. This enables the control module 106 to simply determine the location of the ID and data fields. Also included in the ID field is an ID sync burst that typically is used by the control module 106 to locate the beginning of the data field. The ID sync burst is located a predetermined distance (number of bits) in advance of the data field in the data sector ( Sector 1 )

TABLE 1

A 518-Byte Sector is defined as containing the following fields:

|  | Specification | Bytes @ 20 Mbit/sec | Bytes @ 24 Mbit/sec |
| --- | --- | --- | --- |
| Gap 1 | 11.2 microseconds | 28 | 33 |
| ID Sync | 16 bytes | 16 | 16 |
| ID Sync Pattern | 1 bytes | 1 | 1 |
| ID Field (CCHSF) | 5 bytes | 5 | 5 |

TABLE 1-continued

A 518-Byte Sector is defined as containing the following fields:

|  | Specification | Bytes @ 20 Mbit/sec | Bytes @ 24 Mbit/sec |
| --- | --- | --- | --- |
| ID CRC | 2 bytes | 2 | 2 |
| Gap 2 | 1.6 microseconds | 4 | 5 |
| Data Field Sync | 16 bytes | 16 | 16 |
| Data Sync Pattern | 1 bytes | 1 | 1 |
| Data Field Data | 512 bytes | 512 | 512 |
| Phy Sctr CRC | 6 bytes | 6 | 6 |
| Data Field ECC | 6 bytes | 6 | 6 |
| Gap 3 | 1.6 microseconds | 4 | 5 |
|  | Totals | 601 | 608 |

A 2054-Byte Sector is defined as above, except for a 2048-Byte Data Field.

Data Record Read Operation

Control module 106, in response to a data retrieval request from processor 100, as translated into a head-/actuator/track/sector identifier by control unit 104, monitors the data read by the designated read/write head from the selected data storage track. Control module 106 senses the fields in each data sector. The timing of a typical data read operation is illustrated in schematic form in FIG. 4. Item 400 is an illustration of the physical track of the data storage media. The track 400 of the data storage media is divided up into a plurality of segments (Sector 0 ... Sector 7). A first segment consisting of two sectors (Sector 0, Sector 1) represents an area of the physical track 400 that contains either no data or data that has been determined by the caching algorithms running in the control unit 104 to be undesirable for caching purposes. The second segment of the physical track 400 consisting of Sector 2-Sector 6 represents the portion of the track desirable for caching purposes. Physical track 400 also includes a third segment that consists of Sector 7 that represents further data that is undesirable for caching purposes.

A typical data read operation is initiated by the processor 100 as described above. It is not uncommon for the data read request to be received by the control module 106 while the read/write head 110-0 associated with the track on the data storage media that contains the requested data is located within the extent of the requested data. On FIG. 4, this location would be a position within Sectors 2-6 on physical track 400. The data read request received by control module 106 from the processor 100 identifies the sectors (2-6) of the physical track 400 that have been requested. In addition, Sector Interrupt Pointer (SIP) can be included in the data read request to identify one or more sectors (ex. Sectors 3, 4) within the requested data (Sectors 2-6) that are the immediate target of the processor 100 requesting the data. The SIP can be identified for example by inserting the starting (3) and ending (4) sector numbers of the SIP range as parameters in the command packet received by control module 106 from the processor 100.

Figure 4:
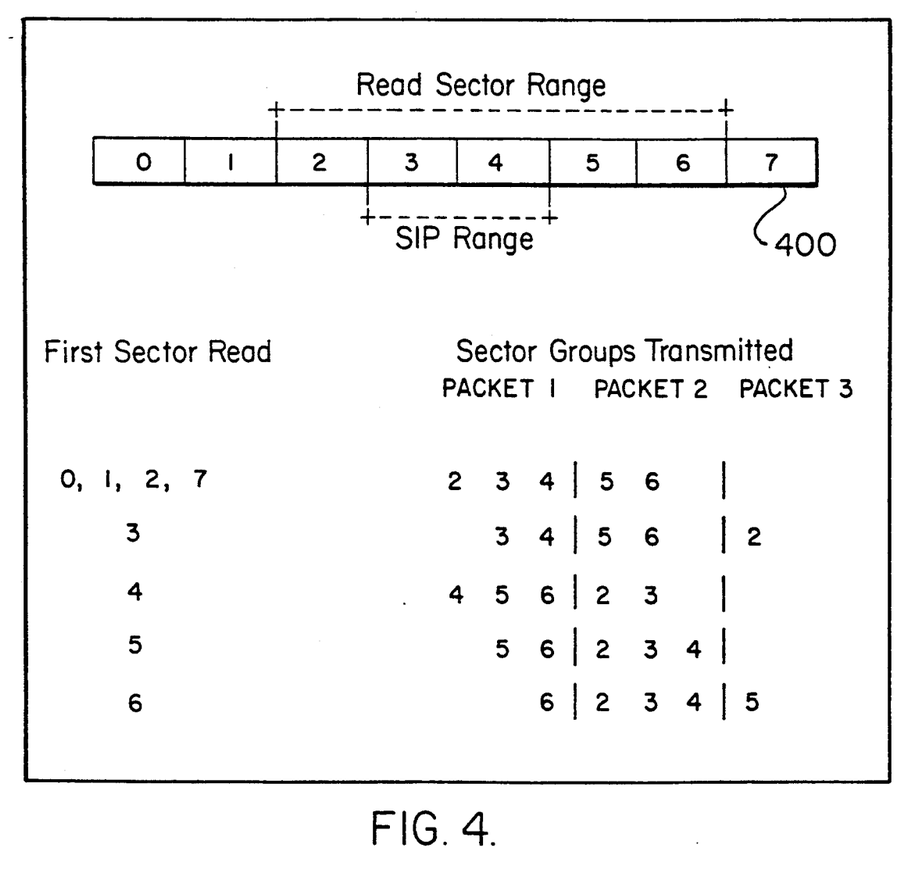
FIG. 4 illustrates the timing of a data read operation.
Figure 5:
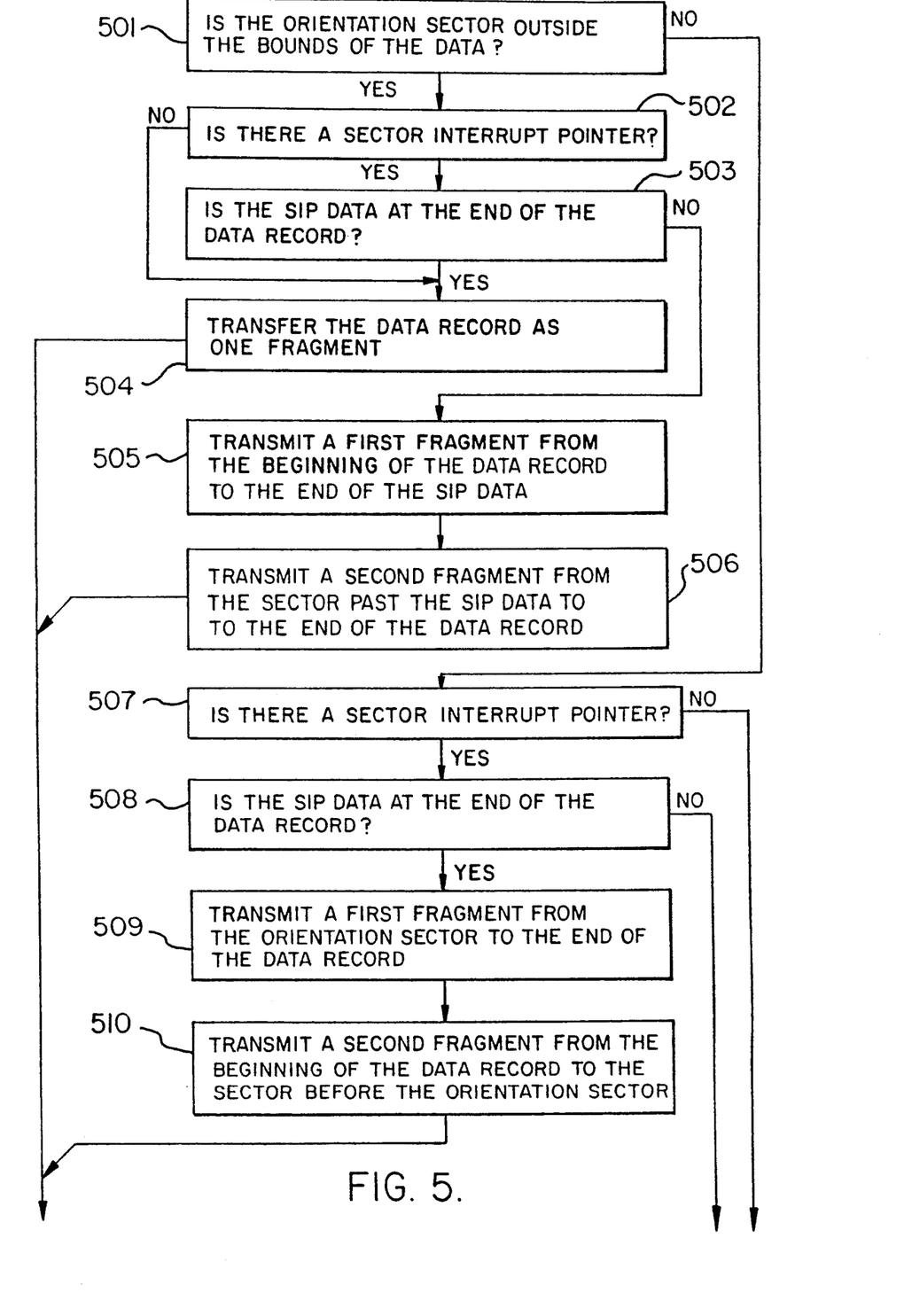
FIGS. 5, 6, 7 illustrate, in flow diagram form, the method of fragmenting the requested data record.
Figure 6:
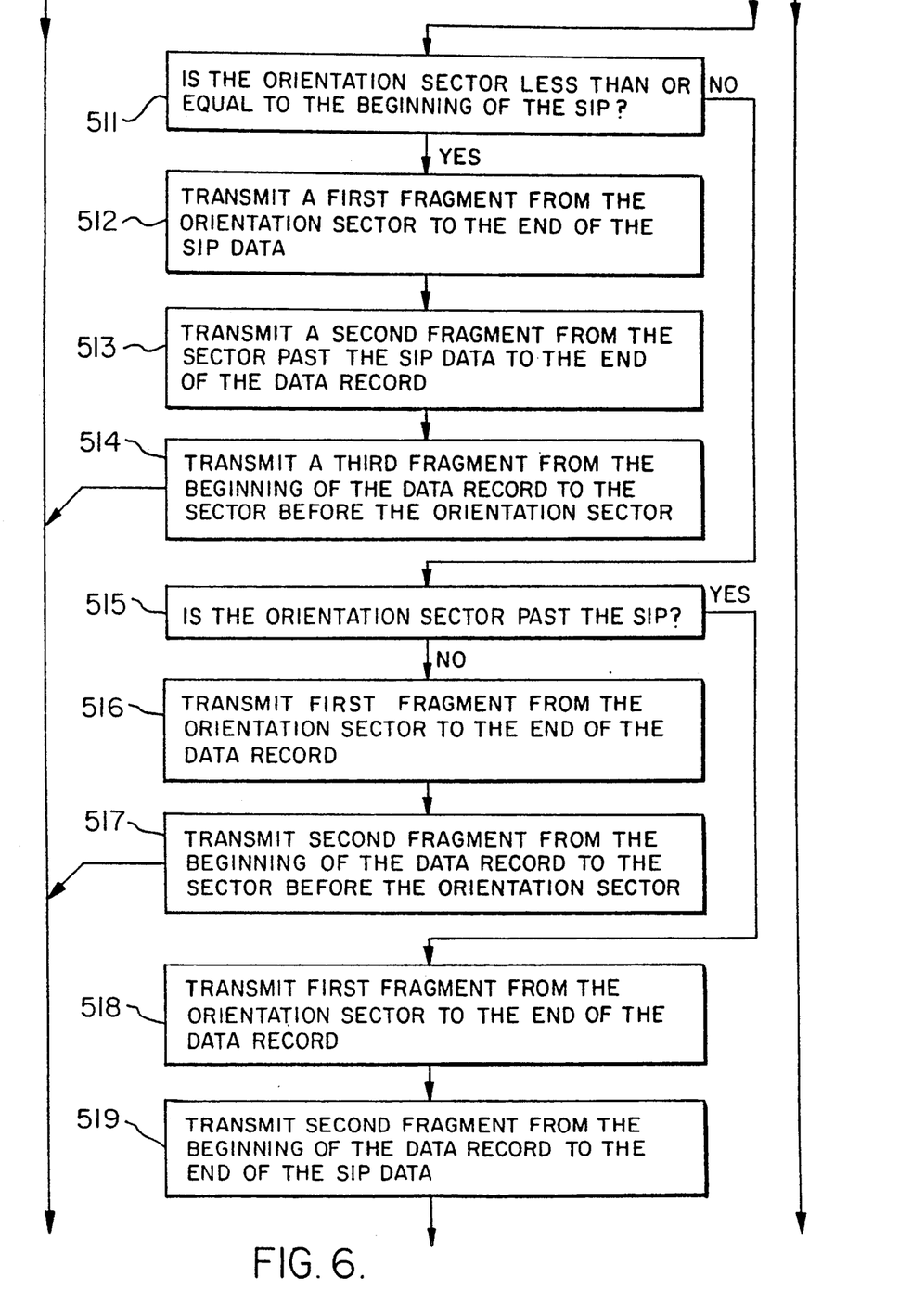
Figure 7:
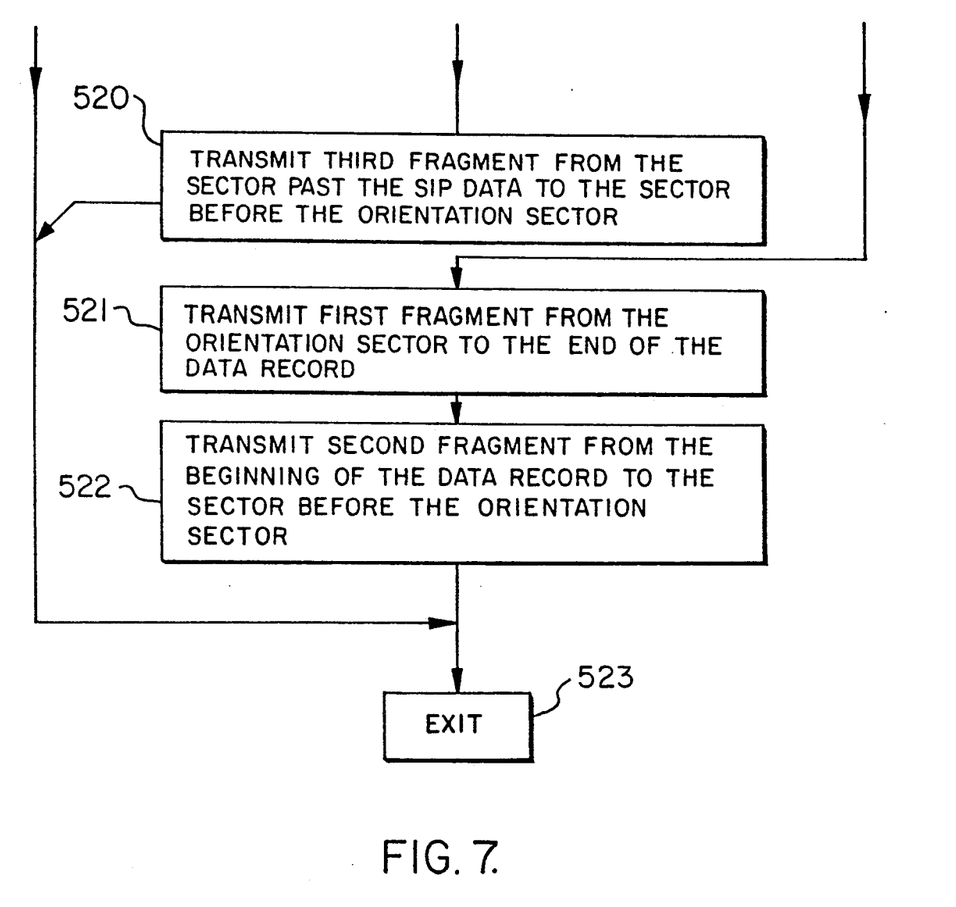

In order to illustrate the data read operation, several examples are provided on FIG. 4 and an operational flowchart is provided on FIGS. 5 and 6. Assume for the purpose of this description, that the data read request is received from processor 100 at a point in time when read/write head 110-0 is in position over Sector 3 of the requested data (Sectors 2-6). It is obvious from the positioning of read/write head 110-0, that in the typical data storage system, the data storage media must rotate through almost an entire revolution before the read/write head 110-0 is again at the beginning of the requested data (Sectors 2-6). These existing data storage systems require that the requested data (Sectors 2-6) be read from the beginning of Sector 2 through to the end of the data at the end of Sector 6. It is obvious that such a requirement consumes a significant amount of time where the processor 100 must wait for the data storage media to rotate to the proper position under read/write head 110-0. The multiple step data read apparatus of the present invention includes control software in control module 106 that retrieves the requested data (Sectors 2-6) in a multiple step process which eliminates the time delay of the prior art systems. The multiple step data read apparatus is activated by the data record read request from processor 100. The control unit 104 determines that the requested data record is not contained in cache. The caching algorithms running in the control unit 104 then determine what portion of the track containing the requested data is desirable to retain in cache. In this example, the desirable portion of the track is sectors 2 through 6 and the requested data is contained in sectors 3 and 4. The control unit 104 produces a read data request containing this information. As part of this request, control module 106 activates read/write head 110-0 upon the receipt of the read data request to begin reading the requested data (Sectors 2-6) as soon as the next physical sector boundary (orientation sector) of the requested data (Sectors 2-6) stored on the physical track 400 is detected as located under read/write head 110-0. The sector boundaries represent an identifiable index point for initiating and terminating data read operations. Upon the positioning of the next physical sector boundary of the requested data (Sectors 2-6) under the read/write head 110-0, control module 106 enables the associated read/write head buffer 108-0 to store the portion of the track image of the data storage track 400 that contains the requested data (Sectors 2-6). Control module 106 considers the orientation of the read/write head 110-0 and determines how the requested data should be fragmented in order to transfer the SIP data in the minimum time possible. The optimum fragmentation is determined from an algorithm known to both the control module 106 and the control unit 104. Control module 106 then communicates to control unit 104 its position with regard to the track 400 so the control unit 104 can determine what data will be sent in each data transfer fragment. With reference to FIG. 4, a number of examples are provided to demonstrate the algorithm that is illustrated in flow diagram form in FIGS. 5 and 6. The left-most column, labeled "First Sector Read" is an indication of the first sector on that data storage track 400 that read/write head 110-0 encounters subsequent to the initiation of the read data request. The right-most column, labeled "Sector Groups Transmitted", is an indication of the sectors on the data storage track 400 that are transmitted in each Packet to processor 100.

In the first example on FIG. 4, the data read operation is initiated when the read/write head 110-0 is positioned over a section of the data storage track 400 outside of the bounds of the requested data (Sectors 2-6) (step 501). The control module then determines whether there is a sector Interrupt Pointer (502) and if so whether the SIP data is at the end of the data record (503). If the SIP data is at the end of the data record, (503) the data retrieval operation then proceeds to transmit the data record in a single fragment (504). However, in the illustrated case, the SIP data is not at the end of the data record so the data record is fragmented into a first fragment consisting of the data sectors from the beginning of the requested data to the end of the SIP data (505). A second fragment is then created consisting of the data from the sector past the end of the SIP data to the end of the requested data (506). The first fragment is transmitted to the processor in a packet (Packet 1) containing Sectors 2-4. Even though Sectors 5-6 could be included in the first fragment, it is transmitted without Sectors 5-6 so as not to delay the transmission of SIP sectors to the processor. The second fragment is then transmitted to the processor in a packet (Packet 2) consisting of Sectors 5-6.

The second example on FIG. 4 is illustrative of a multiple step data read operation. The read sector request is initiated by control unit 104 and the next sector encountered (orientation sector) by read/write head 110-0 is Sector 3, which is the first sector in the SIP (step 511). The read/write head 110-0 reads Sectors 3, 4 and since this is the end of the SIP Range, these two sectors are immediately transmitted (step 512) to control unit 104 and subsequently to processor 100 as Packet 1. Although more sectors can be included in Packet 1, the delay occasioned by reading these sectors delays the transmission of the SIP sectors to processor 100. The second packet, Packet 2, includes the remainder (Sectors 5, 6) of the requested data (Sectors 2-6). Although there remains another sector (Sector 2) of the requested data (Sectors 2-6) yet to be read from the data storage track 400, the second packet (Packet 2) is transmitted (step 513) without Sector 2 to thereby provide control unit 104 with Sectors 5, 6 as quickly as possible. Once read/write head 110-0 is positioned over the remaining sector, Sector 2, it is read and transmitted (step 514) to control unit 104 as Packet 3, thereby completing the transmission of the requested data.

In the third example of FIG. 4, the orientation sector falls within the SIP data. The control module 106 determines at step 507 whether there is a Sector Interrupt Pointer. If not, at step 521 a first fragment, consisting of the data from the orientation sector to the end of the requested data, is transmitted to the processor. Once the disk rotation brings the beginning of the data record under read/write head 110-0, the control module 106 at step 522 transmits the second fragment, consisting of the data from the beginning of the requested data to the orientation sector, to the processor.

If there is a SIP and the SIP data is determined to be at the end of the data record (step 508), the requested data is divided into two fragments. A first fragment, consisting of the data from the orientation sector to the end of the requested data, is transmitted to the processor at step 509. A second fragment, consisting of the data from the beginning of the requested data to the sector before the orientation sector, is transmitted to the processor at step 510.

However, the third example of FIG. 4 is neither of these two cases and, instead, satisfies the NO condition of step 515 since the orientation sector is within the SIP, not past the SIP. Control module 106 at step 516 creates a first fragment, consisting of the data from the orientation sector to the end of the requested data (Sectors 4-6), and transmits this first fragment to the processor in a packet (Packet 1). A second fragment, consisting of the data from the beginning of the requested data to the sector before the orientation sector, is transmitted at step 517 to the processor in a packet (Packet 2).

In the fourth and fifth examples of FIG. 4, the orientation sector lies past the SIP (yes condition at step 515). Then control module 106 at step 518 creates a first fragment, consisting of the data from the orientation sector to the end of the requested data (Sectors 5-6 or 6), and transmits this first segment to the processor in a packet (Packet 1). A second fragment, consisting of the data from the beginning of the requested data to the end of the SIP data (Sectors 2-4), is transmitted at step 519 to the processor in a packet (Packet 2). In the case where additional data lies between the end of the SIP data and the sector before the orientation sector, control module 106 creates a third fragment (Sector 5) at step 520 and transmits this data to the processor in a packet (Packet 3).

Fragmentation Method

The method for communicating the fragmentation information from the disk drive unit 120 to the control unit 104 is based on the disk drive unit 120 and the control unit 104 sharing the same fragmentation algorithm. When the disk drive unit 120 has oriented to a sector, the disk drive unit 120 sends a status packet to the control unit 104 containing the number of the orientation sector. The orientation sector is the first sector that the disk drive unit 120 is capable of transferring to the control unit 104. Since the fragmentation algorithm is known to both the control unit 104 and the disk drive unit 120, the data that is contained in each fragment can be calculated based on the identification of the orientation sector.

The fragmentation algorithm is as follows: If (orientation sector is outside the bounds of the data)

```
If (there is a SIP)
    If (SIP data is at the end of the data)
        All data transferred in a single
        fragment.
    Else (SIP data is not at the end of the
    data)
        First fragment is from the beginning
        of the data to the end of the SIP
        data.
        Second fragment is from the sector
        past the SIP data to the end of the
        data.
    Endif
Else (there is no SIP)
    All data is transferred in a single
    fragment.
Endif
Else (orientation sector > first sector of data)
    If (there is a SIP)
        If (SIP data is at the end of the data)
            First fragment is from the orientation
            sector to the end of the data.
            Second fragment is from the beginning
            of the data to the sector before the
            orientation sector.
        Else (SIP data is not at the end of the
        data)
            If (orientation sector <= beginning of
            SIP)
                First fragment is from the
                orientation sector to the end
                of the SIP data.
                Second fragment is from the
                sector past the SIP data to the
                end of the data.
                Third fragment is from the
                beginning of the data to the
                sector before the orientation
                sector.
            Elseif (orientation sector > beginning
            of SIP)
                First fragment is from the
                orientation sector to the end
                of the data.
                Second fragment is from the
                beginning of the data to the
                sector before the orientation
                sector.
            Else (orientation sector is sector
            past SIP)
                First fragment is from the
                orientation sector to the end
                of the data.
                Second fragment is from the
                beginning of the data to the end
                of the SIP data.
                Third fragment is from the sector
                past the SIP data to the sector
                before the orientation sector.
            Endif
        Endif
    Else (there is not a SIP)
        First fragment is from the orientation
        sector to the end of the data.
        Second fragment is from the beginning of
        the data to the sector before the
        orientation sector.
    Endif
Endif
```

Anticipatory Data Transmission

In order to further speed the data transfer from the data storage media to processor 100, control module 106 signals control unit 104 to request a data communication path to processor 100 via one of the data channels 103-1 to 103-n. The timing of this request such that data transferred from read/write head buffer 108-0 is completed at exactly the same point in time as read/write head 110-0 reads the end of the fragment of data. Thus, the time delay between the start of read/write head 110-0 retrieving the first sector of the fragment of data from physical track 400 and the initiation of the data transfer to processor 100 accounts for the speed differential between these two processes. The timing of the data transfer to processor 100 can be calculated as: data length multiplied by read/write head transfer rate divided by data channel transfer rate. Thus, since the data channel is faster than the read/write head in the data transfer capability, the time differential is calculated using the above formula to designate the time at which the data transfer to processor 100 is initiated.

The second step in the data read operation takes place once the data storage media rotates such that read/write head 110-0 traverses the first segment (Sectors 0, 1) of the data storage track 400. Control module 106 activates the read/write head 110-0 to read the beginning portion (Sectors 2-3) of the requested data (Sectors 2-6) from the start (Sector 2) of the requested data (Sectors 2-6) to the beginning of the first segment (Sectors 4-6) read during the first step of the data read operation. As with the first step described above, the control module 106 initiates a data transfer to processor 100 at a point in time preceding the end of the data read operation a sufficient time such that the data transfer to processor 100 is completed at exactly the same time as the data read operation from the rotating media is completed. The length of time in advance of the completion of the data read operation that this data transfer to processor 100 is initiated is calculated using the same formula as was used for the first step of this process. Thus, by the use of a two step data read operation, the data is transferred as quickly as possible to processor 100 without processor 100 having to wait for the rotation of the data storage media to position the read/write head at the beginning of the requested data. In addition, the use of the anticipatory data transfer to processor 100 timed so that the data transfer completes simultaneously with the completion of the data read operation provides the requested data to the processor 100 in the minimum amount of time.

In the case where the data read request is received by control module 106 when the read/write head is positioned over a sector not within the requested data (Sectors 2-6), then the requested data (Sectors 2-6) can be read in a single step process again making use of the anticipatory data transfer as described for the multi-step data transfer operation (First example of FIG. 4).

While a specific embodiment of the present invention has been disclosed, it is expected that those skilled in the art can and will devise alternate embodiments that fall within the scope of the appended claims.

I claim:

1. A data read apparatus for reading data from a rotating media in a data storage device,
    said rotating media having a plurality of tracks, a plurality of records subdividing said plurality of tracks, and a plurality of sectors subdividing said plurality of records;
    said data storage device having a plurality of read/write heads for reading and writing said rotating media, a control module in communication contact with and interposed between a control unit and said plurality of read/write heads, said control unit in communication contact with a processor by a data channel;
    said data read apparatus comprising;
    plurality of buffer memory means wherein each one of said plurality of read/write heads is coupled to a separate one of said plurality of buffer memory means;
    means, responsive to a data read request received from said processor identifying a requested data record, for detecting a first sector boundary encompassed by said requested data record as said first sector boundary appears under a specific one of said plurality of read/write heads which is closest to the first sector boundary subsequent to said data read request;
    means, in said data storage device, for identifying a beginning of said requested data record;
    means for reading a first segment of said requested data record, from said first sector boundary to the end of said requested data record, into a specific one of said plurality of buffer memory means which corresponds to said specific one of said plurality of read/write heads;
    means for transmitting said first segment of said requested data stored in said specific buffer memory means to said control module;
    means, in said control module, for transferring said first segment of said requested data record to said processor prior to said specific one of said plurality of read/write heads completing said data read request for said requested data record;
    means, in said data storage device and responsive to said means for identifying, for reading a second segment having a plurality of portions of said requested data record, from said identified beginning of said requested data record to said first sector boundary, into said specific buffer memory means;
    means for transmitting a first portion of said second segment stored in said specific buffer memory means to said control module; and
    wherein said transferring means transfers the first portion of said second segment of said requested data record stored in said control module to said processor prior to said specific one of said plurality of read/write heads reaching said first sector boundary while reading other portions of said second segment, upon reaching said first sector boundary completing transferring of said second segment, thereby completing transmission of said requested data record to said processor.

2. The apparatus of claim 1 further comprising:
    means, responsive to said processor identifying at least one of said plurality of sectors in said requested data record as the immediate target, for transmitting at least one of a plurality of target sectors to said processor as said plurality of target sectors are read from said rotating media of said data storage device.

3. The apparatus of claim 2 further comprising:
    means for fragmenting said plurality of sectors according to a predetermined algorithm into at least two packets for transmission to said processor as soon as each said packet is filled with said plurality of sectors read from said rotating media of said data storage device.

4. The apparatus of claim 3 further comprising:
    means for sending data to said control module identifying said first sector boundary prior to transmitting at least one of said plurality of target sectors.

5. The apparatus of claim 4 further comprising:
    mean, in said control module, for reordering said plurality of sectors into an order in which said plurality of sectors appeared on said plurality of tracks based on said predetermined algorithm, said first sector boundary identification data, and said plurality of sector.

6. The apparatus of claim 5 further comprising:
    means, responsive to a transmission of a last target sector in said first segment of said control module, for activating said transmitting means to transmit to said control module, non-target sectors which appear in said first segment subsequent to said last target sector.

7. The apparatus of claim 1 wherein said activating means includes:
    means for calculating a first length of time required for said transmitting means to transmit said first segment of said requested data record to said control module; and
    means for enabling said transmitting means, said calculated length of time in advance of said read/write head reaching said end of said requested data record.

8. The apparatus of claim 7 wherein:
    said calculating means is responsive to said identifying means for calculating a second length of time required for said transmitting means to transmit said second segment of said requested data record to said control module; and said enabling means is further responsive to said calculating means for activating said transmitting means said second segment transmission time in advance of said first sector boundary.

9. A method for reading data from a rotating media in a data storage device,
said rotating media having a plurality of tracks, a plurality of records subdividing said plurality of tracks, and a plurality of sectors subdividing said plurality of records;
said data storage device having a plurality of read/write heads for reading and writing said rotating media, a control module in communication contact with and interposed between a control unit and said plurality of read/write heads, said control unit in communication contact with a processor by a data channel:
plurality of buffer memory means wherein each one of said plurality of read/write heads is coupled to a separate one of said plurality of buffer memory means;
said method comprising:
detecting, in response to a data read request received from said processor identifying a requested data record, a first sector boundary encompassed by said requested data record as said first sector boundary appears under a specific one of said plurality of read/write heads which is closest to the first sector boundary subsequent to said data read request;
identifying a beginning of said requested data record;
reading a first segment of said requested data, from said a specific one first sector boundary to the end of said requested data record, into a specific one of said plurality of buffer memories which corresponds to said specific one of said plurality of read/write heads;
transmitting said first segment of said requested data stored in said specific buffer memory means to said control module;
transferring said first segment of said requested data record to said processor prior to said specific one of said plurality of read/writ heads completing said data read request for said requested data record;
reading a second segment of having a plurality of portions of said requested data record, from said identified beginning of said requested data record to said first sector boundary, into said specific buffer memory means;
transmitting a first portion of said second segment stored in said specific buffer memory means to said control module; and
transferring the first portion of said second segment of said requested data record stored in said control module to said processor prior to said specific one of said plurality of read/write heads reaching said first sector boundary while reading other portions of said second segment, upon reaching said first sector boundary completing transferring of said second segment, thereby completing transmission of said requested data record to said processor.

10. The method of claim 9 further comprising the step of:
transmitting, in response to said processor identifying at least one of said plurality of sectors in said requested data record as the immediate target, at least one of a plurality of target sectors to said processor as said plurality of target sectors are read from said rotating media of said data storage device.

11. The method of claim 10 further comprising the step of:
fragmenting said plurality of sectors according to a predetermined algorithm into at least two packets for transmission to said processor as soon as each said packet is filled with said plurality of sectors read from said rotating media of said data storage device.

12. The method of claim 11 further comprising the step of:
sending data to said control module identifying said first sector boundary prior to transmitting at least one of said plurality of target sectors.

13. The method of claim 12 further comprising the step of:
reordering, in said control module, said plurality of sectors into an order in which said plurality of sectors appeared on said plurality of tracks based on said predetermined algorithm, said first sector boundary identification data, and said plurality of sectors.

14. The method of claim 13 further comprising the step of:
transmitting, in response a transmission of a last target sector in said first segment, to said control module, non-target sectors which appear in said first segment subsequent to said last target sector.

15. The method of claim 9 wherein said step of activating includes the steps of:
calculating a first length of time required for said transmitting means to transmit said first segment of said requested data record to said control module; and
enabling said step of calculating said length of time in advance of said read/write head reaching said end of said requested data record.

16. The method of claim 15 further including the steps of:
calculating a second length of time required for said transmitting means to transmit said second segment of said requested data record to said control module; and
enabling said step of transmitting said second segment transmission time in advance of said first sector boundary.

17. A data storage system connected to a processor for storing data, comprising:
a control module;
a plurality of rotating media;
a plurality of read/write heads for writing data onto one of said plurality of rotating media;
means, responsive to a data read request, for detecting a first sector boundary encompassed by a requested data record on a track and appearing under a specific one of said plurality of read/write heads which is closest to the first sector boundary subsequent to said data read request;
means for reading a first segment of said requested data record, from said first sector boundary to an end of said data record, into a specific one of a boundary buffer memory means interposed between one of said plurality of read/write heads and a bus wherein each one of said plurality of read/write heads is coupled to a separate one of said plurality of buffer memory means and the specific buffer memory corresponds to said specific one of said plurality of read/write heads;

means for transmitting said first segment of said requested data record stored in said specific buffer memory means to said control module by way of said bus;

means, responsive to said detecting means, for activating said transmitting means prior to said specific one of said plurality of read/write heads reaching said end of said requested data record, including:
means for calculating a first length of time required for said transmitting means to transmit said first segment of said requested data record to said control module by way of said bus;
means for enabling said transmitting means and said means for calculating in advance of said specific one of said plurality of read/write heads reaching said end of said requested data record;

means, in said control module, for transferring said first segment of said requested data record to said processor prior to said specific one of said read/write heads completing the said data read request of said requested data record;

means for identifying a beginning of said requested data record on said track;

wherein said reading means is responsive to said identifying means for reading a second segment having a plurality of portions of said requested data from said beginning of said requested data record to said first sector boundary, into said specific buffer memory means;

wherein said calculating means is responsive to said identifying means for calculating a second length of time required for said transmitting means to transmit said second segment of said requested data record to said control module by way of said bus; and wherein said enabling means is further responsive to said calculating means for enabling said transmitting means said second segment transmission time in advance of said first sector boundary means for transmitting a first portion of said second segment stored in said specific buffer memory means to said control module; and wherein said transferring means transfers to first portion of a said second segment of said requested data record stored in said control module to said processor prior to said specific one of said plurality of read/write heads reaching said first sector boundary while reading other portions of said second segment, upon reaching said first sector boundary completing transferring of said second segment, thereby completing transmission of said requested data record to said processor.

* * * * *